Feb. 7, 1933.    F. M. PYZEL    1,896,420
PROCESS OF PRODUCING HYDROGEN
Filed Aug. 13, 1928

INVENTOR
FREDERICK M. PYZEL
BY HIS ATTORNEY

Patented Feb. 7, 1933

1,896,420

UNITED STATES PATENT OFFICE

FREDERIC M. PYZEL, OF PIEDMONT, CALIFORNIA, ASSIGNOR TO SHELL DEVELOPMENT COMPANY, OF SAN FRANCISCO, CALIFORNIA, A CORPORATION OF DELAWARE

PROCESS OF PRODUCING HYDROGEN

Application filed August 13, 1928. Serial No. 299,291.

This process relates to the production of hydrogen from hydrocarbons.

It is a purpose of this invention to provide a method suitable for the economical production of hydrogen of a high degree of purity from hydrocarbons.

Many processes for the production of hydrogen from hydrocarbons have been proposed, but so far these proposed processes fail to offer a solution for the problem of producing hydrogen by decomposition of hydrocarbon at the low cost required to make its use in many hydrogenation processes profitable. This failure is to be ascribed to the desire of inventors to produce nearly pure hydrogen directly by thermal decomposition of hydrocarbons, for which purpose excessively high temperatures and long reaction times are required, which result in shortening the life of the apparatus and increasing the cost of construction, operation and maintenance.

Now I have found that hydrogen can be obtained from hydrocarbons in an economical manner by employing the process hereinafter described:

Briefly, my process consists of decomposing hydrocarbons by heat but limiting such decomposition, by suitable combination of time and temperature, so that the gas produced in this decomposition will contain, besides hydrogen, appreciable quantities of methane and other hydrocarbons. This methane and other gases are then separated from the hydrogen and utilized mainly for supplying the heat required for the decomposition of the hydrocarbon material.

Figure 1:
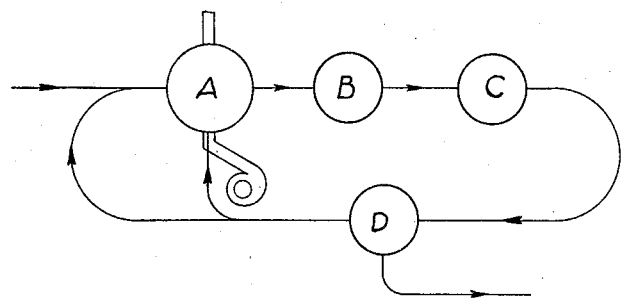

Referring to the schematic flow diagram shown in Figure 1, hydrocarbon gas or a gas mixture rich in hydrocarbon gas or vapors, such as natural gas or cracking plant gas, is led through a converter A, heated to a high temperature and partially decomposed (total decomposition being understood as signifying practically complete decomposition into hydrogen and carbon). The resultant gas is then cooled and freed from soot or lampblack in a dry or wet separator B, further deprived of its tar and naphthaline contents in the washers C, and then fractionated in the fractionating plant D, into hydrogen of such purity as required, and a rest-gas rich in methane, containing also such other impurities as are present in the converted gas. This methane-rich rest-gas is used as fuel for heating the converter A, while any excess over the quantity of rest-gas required for this purpose may be either returned to the converter for further decomposition or used for any other purpose.

It is to be noted that none of the raw material is used as such in the production of heat. Thus the hydrocarbons, other than methane, present in the raw material are utilized entirely for the production of hydrogen. As these hydrocarbons decompose more rapidly and at lower temperature than methane, their value as raw material is obvious. As a matter of fact, methane is one of the primary decomposition products of heavier hydrocarbons, so that even if the raw material contains no methane, considerable quantities of the latter will always be present, in the converted gas, unless excessive temperatures and long reaction times are employed.

In such partial decomposition by heat a variety of by-products are formed. Unsaturated gaseous hydrocarbons will be produced, which may be obtained as a separate fraction at the fractionating plant. These unsaturated hydrocarbons will be principally ethylene and propylene and thus constitute a valuable by-product. Liquid hydrocarbons, of a tar like nature, are another by-product of this process. Considerable quantities of soot will be deposited in the converter and washed or otherwise removed from the effluent gas. As this soot is of inferior quality it is of value only as a fuel. For this reason the deposition of this soot in the converter is favored as much as possible, as explained further on.

While hydrocarbon gases, such as natural gas or gases evolved by cracking processes are a very desirable raw material, liquid hydrocarbons may also advantageously be employed for the production of hydrogen by this process.

Figure 2:
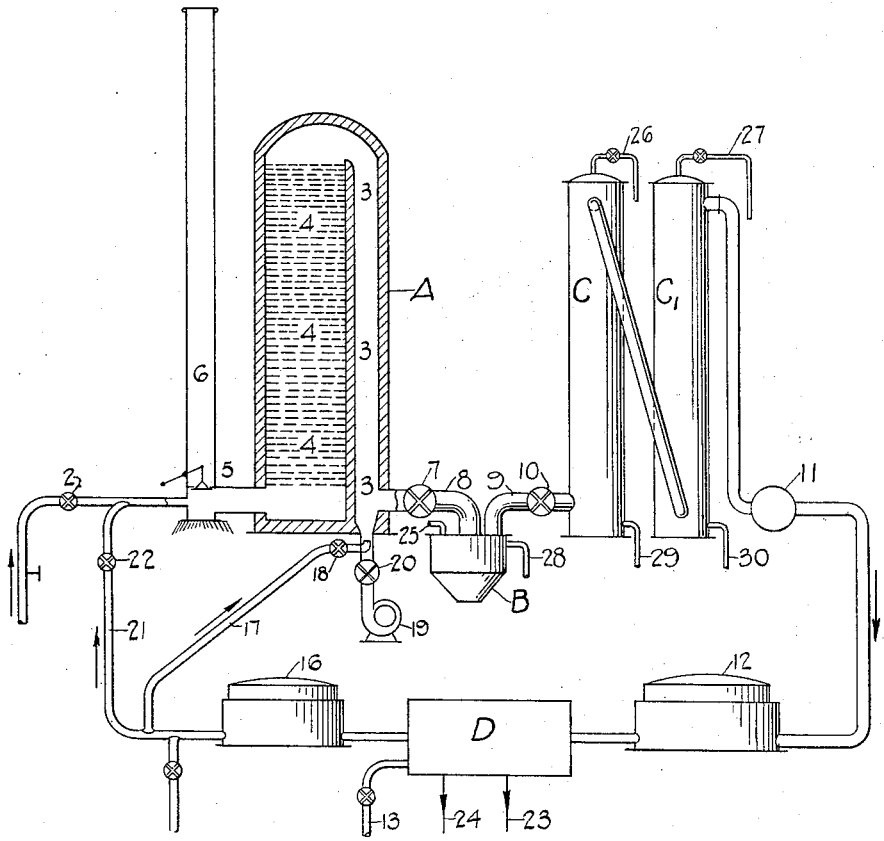

Apparatus suitable for carrying this process into effect is shown in Figure 2. Hydrocarbon gas, obtained from some suitable source, not shown, passes through pipe 1, connecting with said source, through the control valve 2 into the converter, where the gas is heated to the temperature suitable for the desired degree of partial conversion while the velocity of the gas is regulated so that it is maintained at this temperature (on the order of 900° to 1100° C.) for a sufficient length of time to effect conversion into a gas of the desired proportion of hydrogen and methane.

The converter A shown is quite similar in construction to the hot blast stoves employed in the iron and steel industry for imparting heat to the blast air required for the blast furnaces. The converter is first heated by combustion, in the chamber 3, of the methane-fraction (rest-gas) obtained from the converted hydrogen-methane gas in the manner to be described later, the products of combustion passing down through the refractory checker work 4, and out through the stack valve 5, and stack 6. When sufficient heat has been stored in the refractory material, the fuel and air supply are cut off, the stack valve 5 is closed and the hydrocarbon-material to be converted is introduced as above explained, through pipe 1 and valve 2. The heat imparted to the hydrocarbons by the refractory filling 4, causes their partial decomposition, which is controlled so as to produce the desired hydrogen-methane mixture, by a suitable adjustment of average temperature and gas velocity. As heat is consumed both for heating and for decomposing the hydrocarbon gas, the temperature of the converter, and therewith the rate of decomposition, decrease gradually, finally necessitating interruption of the conversion and repetition of the heating operation. The converter is thus operated discontinuously, alternately being heated, and converting.

In the partial decomposition of the hydrocarbons contained in the raw gas, considerable quantities of carbonaceous products are formed ranging from a soot-like material to material of a graphitic character. By proper arrangement of the refractory checker work in the converter and by keeping the gas velocities during the conversion period low, the deposition of this carbonaceous by-product on the checker work is favored as much as possible. During the heating or blowing period this carbonaceous deposit is burned, producing a considerable part of the heat required in the process. The converted gas thus produced will contain say 65% to 75% by volume of hydrogen, the remainder being primarily methane. This gas leaves the converter through the hot valve 7, passing through the conduit 8 into the water seal and soot remover B, then passing through the pipe 9 and valve 10 into the system of scrubbers C and $C_1$ where further purification takes place and entrained tar, naphthaline and light oils, by-products of the partial decomposition of the hydrocarbons, are removed by water and oil washing.

The cleaned converted gas then passes through the exhauster 11 into the gasometer 12. The latter serves to absorb the irregularities of the flow of converted gas. From the gasometer the gas passes into a gas-separating plant which may be of the Linde, or Claude type described in Chemical Dictionary—Hackh, page 185 (1929), in Reference Book of Inorganic Chemistry—Latimer and Hildebrand, pages 17 and 18 (1929) and in Handbook of Chemical Engineering—Liddel, Vol. II., page 671 (1922), or any other system indicated in the drawing at D. The Linde and Claude processes make use of the extremely low boiling point of hydrogen ($-260°$ C.) in separating hydrogen from other gases by compression of the gaseous mixture and removal of the various liquefied fractions. Here the converted gas is separated into a hydrogen fraction of such purity as demanded by the subsequent use of this fraction, and a fraction rich in methane, containing such other impurities as must be eliminated from the hydrogen fraction, and are of no value as by-product.

The hydrogen fraction is obtained at 13, and stored, or piped to the place of consumption. This fraction may be obtained at considerable pressure, as high pressure is required in some separating processes, and it is then especially suited for direct utilization in high pressure synthesis or hydrogenation-processes. The methane-rich fraction (rest-gas) is passed into a gasometer 16, to be used for heating the converter, by means of pipe 17 and valve 18, air for combustion being supplied by the blower 19 and blast valve 20. The excess is used as additional raw material for conversion if so desired. Pipe 21 and valve 22 are provided for this purpose.

Gaseous by-products such as ethylene and propylene gas are obtained from the fractionating plant at 23 and 24. The pipes 25, 26 and 27 serve to supply the washing medium to the washers or scrubbers. Pipes 28, 29 and 30 serve to remove the enriched wash liquors.

The apparatus, if to be used for the conversion of liquid hydrocarbon, needs very little modification from the above described arrangement. The liquid hydrocarbon may be vaporized and introduced as such into the pipe 1, the process being further identical to that above described using gaseous hydrocarbon, or the liquid hydrocarbon is charged directly to the converter by the aid of sprayers, which may be of the mechanical type, or possibly of the steam, air or gas atomization type. If gas is to be used for atomization, the methane-rich gas can be used to advantage.

I claim as my invention and desire to secure by Letters Patent:

1. In a process for the conversion of hydrocarbons into hydrogen, the steps of: partially decomposing said hydrocarbons by heat while maintaining the thermal conditions of such order that the substantial decomposition of methane is avoided, fractionating the resultant gas into a fraction consisting of hydrogen of the desired degree of purity, and a fraction rich in methane, comprising the undesirable components of the gas resultant from the decomposition, and deriving the heat required for the decomposition from the combustion of the latter fraction.

2. The process of producing hydrogen of a high degree of purity from hydrocarbons, consisting of: partially decomposing said hydrocarbons by heat in a converter chamber while maintaining the thermal conditions of such order that the substantial decomposition of methane is avoided, removing solid and liquid impurities from the resultant gas, separating the gas by fractionation into a fraction containing hydrogen of the desired degree of purity, and a rest fraction, and supplying the heat required for the decomposition by combustion of the rest fraction in the converter chamber.

3. The process of producing substantially pure hydrogen from hydrocarbons, consisting of: partially decomposing said hydrocarbons in a converter by passing the hydrocarbons in gaseous condition over heated refractory material, regulating the degree of decomposition by regulation of the velocity and quantity of the gas and the temperature of the refractory material so that the substantial decomposition of methane is avoided, purifying and fractioning the resultant gas, and heating the converter by combustion of the undesirable components, separated by the fractionation.

4. The process of converting hydrocarbons into substantially pure hydrogen, comprising: alternately heating a converter filled with refractory material, and partially converting therein said hydrocarbons into hydrogen, by passing them in gaseous condition over the heated refractory material while maintaining the thermal conditions of such order that the substantial decomposition of methane is avoided, removing solid and liquid impurities from the resultant gas, fractionating this gas into substantially pure hydrogen, and an undesirable rest fraction, using part of the rest fraction to heat the converter chamber in alternate periods, by combustion therein, and further converting the balance of the rest fraction by repassing through the converter chamber during converting periods.

5. In a process for the conversion of hydrocarbons into hydrogen, the steps of: decomposing said hydrocarbons by heat, while maintaining the thermal conditions of such order that the substantial decomposition of methane is avoided, fractionating the resultant gas into a fraction consisting of hydrogen of the desired degree of purity, and a fraction in methane, comprising the undesirable components of the gas resultant from the decomposition, and deriving the heat required for the decomposition from the combustion of the latter fraction.

6. The process of producing substantially pure hydrogen from hydrocarbons, consisting of: partially decomposing said hydrocarbons in a converter by passing the hydrocarbons in gaseous condition over heated refractory material, substantially confining the decomposition to the fractions heavier than methane, by regulation of the velocity and the quantity of gas and the temperature of the refractory material, purifying and fractionating the resultant gas, and heating the converter by combustion of the undesirable compounds, separated by the fractionation.

7. The process of producing substantially pure hydrogen from hydrocarbons comprising partially decomposing said hydrocarbons by heat while maintaining the thermal conditions of such order that the substantially total decomposition of methane is avoided and substantially removing the hydrogen formed from its admixture with other gases by a gas separating process.

8. In a process for the conversion of hydrocarbons into hydrogen the steps comprising: partially decomposing said hydrocarbons by heat, while maintaining the thermal conditions of such order that substantially total decomposition of methane is avoided, and fractionating from the resultant gas a fraction consisting of hydrogen of a desired degree of purity.

9. In a process for the conversion of hydrocarbons into hydrogen the steps comprising: partially decomposing said hydrocarbons by heat, while maintaining the thermal conditions of such order that substantially total decomposition of methane is avoided and fractionating the resultant gas into a fraction consisting of hydrogen of a desired degree of purity and separate fractions of the various other constituents of said resultant gas.

10. In a process for the conversion of hydrocarbons into hydrogen the steps comprising: partially decomposing said hydrocarbons by heat while maintaining the thermal conditions of such order that substantially total decomposition of methane is avoided and fractionating the resultant gas into a fraction consisting of hydrogen of a desired degree of purity and a friction rich in methane.

11. In a process for the conversion of hydrocarbons into hydrogen the steps comprising partially decomposing said hydrocarbons by heat while maintaining the thermal conditions of such order that substantially total decomposition of methane is avoided and fractionating hydrogen of a desired degree of purity from the resultant gas by means of a gas liquefaction process.

In testimony whereof, I have hereunto set my hand.

FREDERIC M. PYZEL.